US012585575B2

(12) United States Patent
Ren et al.

(10) Patent No.: US 12,585,575 B2
(45) Date of Patent: Mar. 24, 2026

(54) AUTO-COMPLETE TESTING

(71) Applicant: MICRO FOCUS LLC, Santa Clara, CA (US)

(72) Inventors: Yi-Qun Ren, Shanghai (CN); Kai Hu, Shanghai (CN); Gen-Cheng Shen, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 239 days.

(21) Appl. No.: 18/231,233

(22) Filed: Aug. 7, 2023

(65) Prior Publication Data

US 2025/0053502 A1    Feb. 13, 2025

(51) Int. Cl.
*G06F 11/3668* (2025.01)
*G06F 40/274* (2020.01)

(52) U.S. Cl.
CPC ...... *G06F 11/3688* (2013.01); *G06F 11/3692* (2013.01); *G06F 40/274* (2020.01)

(58) Field of Classification Search
None
See application file for complete search history.

(56) References Cited

U.S. PATENT DOCUMENTS

| | | | | |
|---|---|---|---|---|
| 7,191,326 | B2 * | 3/2007 | Louden | ................. G06F 11/263 |
| | | | | 717/124 |
| 8,386,926 | B1 * | 2/2013 | Matsuoka | ............. G06F 40/274 |
| | | | | 715/256 |
| 8,713,042 | B1 * | 4/2014 | Zinenko | ........... G06F 16/90328 |
| | | | | 707/765 |
| 9,122,376 | B1 * | 9/2015 | Brotherston | .......... G06F 3/0237 |
| 9,928,161 | B1 * | 3/2018 | Costello | .............. G06F 11/3684 |
| 11,169,908 | B1 * | 11/2021 | Lu | ....................... G06F 11/3688 |
| 11,288,169 | B2 * | 3/2022 | Gillaspie | ............. G06F 11/3698 |
| 11,340,871 | B1 * | 5/2022 | Masis | ....................... G06F 8/33 |
| 2009/0187399 | A1 * | 7/2009 | O'Dell | ................... G06F 40/129 |
| | | | | 704/8 |
| 2009/0225041 | A1 * | 9/2009 | Kida | ..................... G06F 3/0237 |
| | | | | 345/173 |
| 2011/0214053 | A1 * | 9/2011 | Scott | ..................... G06F 40/232 |
| | | | | 715/764 |
| 2015/0149952 | A1 * | 5/2015 | Baheti | ................. G06F 3/04883 |
| | | | | 715/780 |
| 2015/0317234 | A1 * | 11/2015 | Ligman | ............... G06F 11/3612 |
| | | | | 714/38.1 |
| 2016/0283446 | A1 * | 9/2016 | Okajima | .............. G06F 40/274 |
| 2017/0192991 | A1 * | 7/2017 | Touma | ................ G06F 16/3322 |
| 2018/0084047 | A1 * | 3/2018 | Hao | ...................... G06F 11/3688 |
| 2020/0036620 | A1 * | 1/2020 | Willshire | .............. H04L 51/214 |
| 2020/0117577 | A1 * | 4/2020 | Saxena | .............. G06F 11/3696 |

(Continued)

*Primary Examiner* — Jason D Mitchell
(74) *Attorney, Agent, or Firm* — Sheridan Ross P.C.

(57)    ABSTRACT

One or more characters are input into an auto-complete field. Text of a displayed list of one or more candidate items is retrieved. The text of the displayed list of the one or more candidate items is compared to a predefined candidate item. In response to the text of the displayed list of one or more candidate items not having the predefined candidate item or not being withing a defined ranking, test results are flagged where the predefined candidate item is missing from displayed list of the one or more candidate items or is not withing the defined ranking. This allows the for automated testing of the auto-complete fields.

20 Claims, 4 Drawing Sheets

(56) References Cited

U.S. PATENT DOCUMENTS

| | | | | |
|---|---|---|---|---|
| 2020/0133824 A1* | 4/2020 | Wang | | G06F 9/451 |
| 2021/0397546 A1* | 12/2021 | Cser | | G06V 10/82 |
| 2022/0164278 A1* | 5/2022 | Coffin | | G06F 11/3688 |
| 2023/0214239 A1* | 7/2023 | Singh | | G06N 3/0464 |
| | | | | 715/704 |
| 2023/0359241 A1* | 11/2023 | Faaborg | | G06V 40/168 |
| 2025/0165709 A1* | 5/2025 | Mac an tSaoir | | G06F 3/04842 |
| 2025/0166852 A1* | 5/2025 | Diggett | | G16H 20/17 |

* cited by examiner

AUTO-COMPLETE TESTING

FIELD

The disclosure relates generally to software testing and particularly to testing of auto-complete functions in software.

BACKGROUND

As software becomes more complicated, autocomplete-prediction features are becoming increasingly complex and customizable. For example, a user may be able to turn off personal prediction results, report unexpected predictions, and so on. As a result, it has become difficult to try and automate testing of this type of software.

SUMMARY

These and other needs are addressed by the various embodiments and configurations of the present disclosure. The present disclosure can provide a number of advantages depending on the particular configuration. These and other advantages will be apparent from the disclosure contained herein.

One or more characters are input into an auto-complete field. Text of a displayed list of one or more candidate items is retrieved. The text of the displayed list of the one or more candidate items is compared to a predefined candidate item. In response to the text of the displayed list of one or more candidate items not having the predefined candidate item or not being withing a defined ranking, test results are flagged where the predefined candidate item is missing from displayed list of the one or more candidate items or is not withing the defined ranking. This allows the for automated testing of the auto-complete fields.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
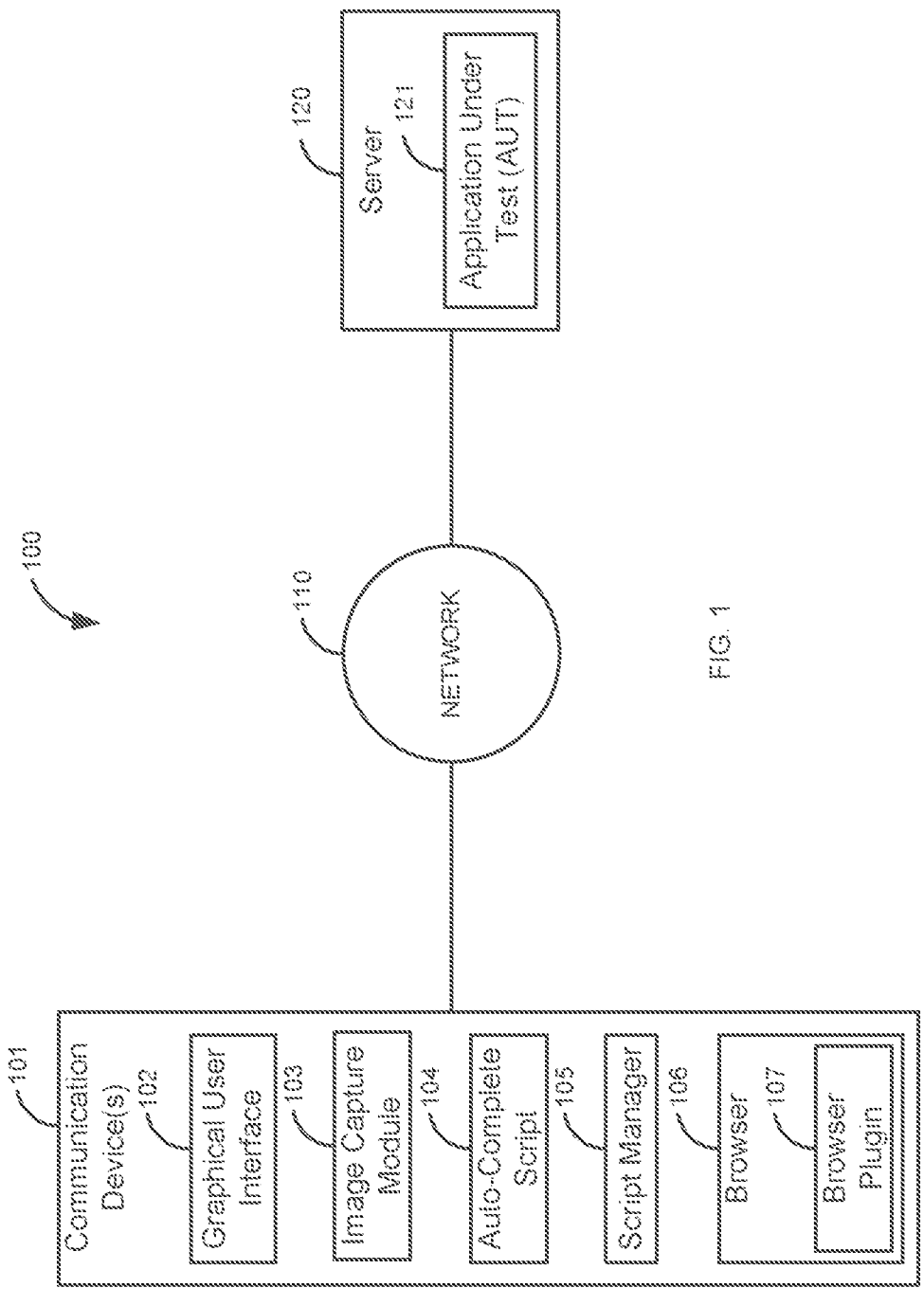
FIG. 1 is a block diagram of a first illustrative system for testing auto-complete software in a graphical user interface.

FIG. 1 is a block diagram of a first illustrative system 100 for testing auto-complete software in a graphical user interface 102. The first illustrative system 100 comprises a communication device(s) 101, a network 110, and a server 120.

The communication device 101 can be or may include any device that can communicate on the network 110, such as a Personal Computer (PC), a telephone, a video system, a cellular telephone, a Personal Digital Assistant (PDA), a tablet device, a notebook device, a smartphone, and/or the like. As shown in FIG. 1, any number of communication devices 101 may be connected to the network 110, including only a single communication device 101. In one embodiment, multiple communication devices 101 may be used to test the AUT 121 at the same time.

The communication device 101 further comprises the graphical user interface 102, an image capture module 103, an auto-complete script 104, a script manager 105, and a browser 106. The graphical user interface 102 may be any type of graphical user interface 102 that uses auto-completion. The graphical user interface 102 may be displayed via an application, via the browser 106, and/or the like.

The image capture module 103 can be or may include any hardware coupled with software that can capture text displayed in the graphical user interface 102. The image capture module 103 may convert the captured images to text using techniques such as, Optical Character Recognition (OCR), and/or the like.

The auto-complete script 104 is test software that is designed to evaluate the auto-complete functions for the Application Under Test (AUT) 121. The auto-complete script 104 is used to make sure that the AUT 121 works properly in regard to auto-complete features.

The script manager 105 can be or may include any combination of hardware coupled with software that can be used to take images/data from the image capture module 103/browser plugin 107 and use that data to provide input into the auto-complete script 104. For example, the script manager 105 can retrieve captured data for displayed lists of one or more candidate items to make sure the list matches an expected list of items.

The browser 106 can be any browser 106, such as, Bing®, Chrome®, Firefox®, Safari®, Kingpin, and/or the like. The browser 106 further comprises a browser plugin 107. The browser plugin 107 is used to retrieve data for the displayed lists of candidate items when data is input into an auto-complete field. In one embodiment, the browser plugin 107 can retrieve the text directly from the code that is sent to the browser 106 via the AUT 121.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The server 120 can be any type of server 120 that can run the AUT 121. For example, the server 120 may be an application server, a web server, a security server, a database server, a financial server, a search engine, a corporate server, an embedded device, and/or the like.

The AUT 121 may be any application that uses auto-complete functionality, such as, a web application, a client-server application, a search engine, a financial application, a security application, a database application, an embedded application, and/or the like. In one embodiment, the AUT 121 may reside on the communication device 101 instead of the server 120.

Figure 2:
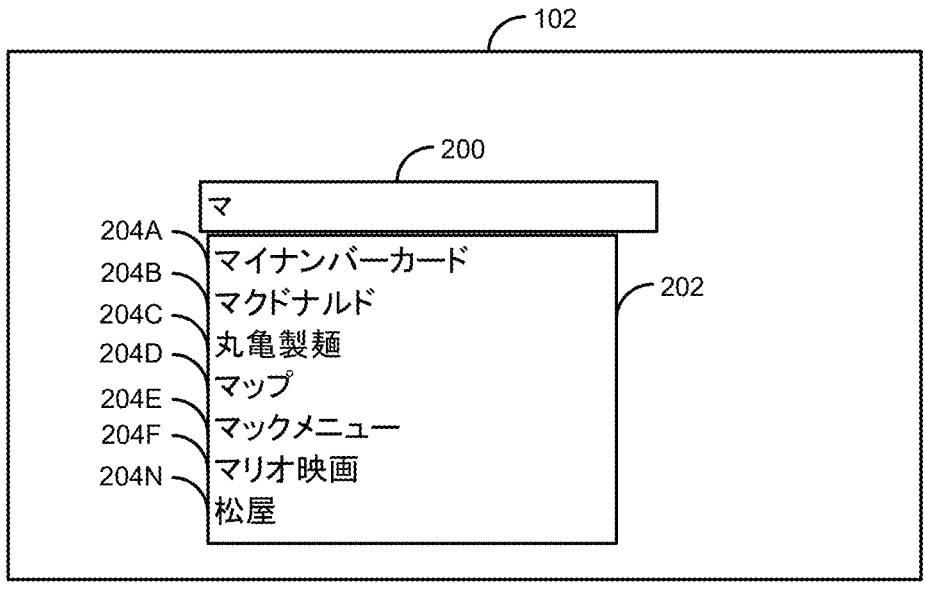
FIG. 2 is an exemplary diagram of a user interface that that is captured for testing auto-complete software.

FIG. 2 is an exemplary diagram of a user interface 102 that is captured for testing auto-complete software. The user interface 102 comprises an auto-complete field 200 and a displayed list of candidate items 202.

The auto-complete field 200 may be any field that provides one or more suggestions as a user types in characters. The auto-complete field 200 typically supports languages that require multiple keystrokes to produce a single character, such as, Chinese (e.g., pin yin), Korean, and/or the like. For these types of languages, a single keystroke can produce multiple displayed candidate items 202 as possibilities. Sometimes, it may take 2-4 keystrokes to actually reach the character the user is trying to generate. For each keystroke, a different list of candidate items 202 may be displayed. Thus, for these types of languages, there may be a significantly larger number of displayed lists of candidate items 202 than for languages that only require a single keystroke to produce a single character.

The displayed list of candidate items 202 is a list of potential options that the user may select to complete what the user is looking for. The displayed list of candidate items 202 further comprises individual candidate items 204A-204N. The candidate items 204A-204N are for the typed character Japanese character マ. The candidate items 204A-204N are Japanese characters are shown as follows:

マイナンバーカード
マクドナルド
丸亀製麺
マップ
マックメニュー
マリオ映画
松屋

The displayed list of candidate items 202 can change for each keystroke. For example, if the Japanese character マ requires three keystrokes (e.g., xbh) to be generated, the displayed list of candidate items 202 will likely change for each keystroke until the Japanese character マ is displayed. The scripts manager 105 can compare predefined results (predefined candidate items) to the displayed list of candidate items 202 each time the displayed list of candidate items 204A-204N changes (e.g., for each keystroke).

Figure 3:
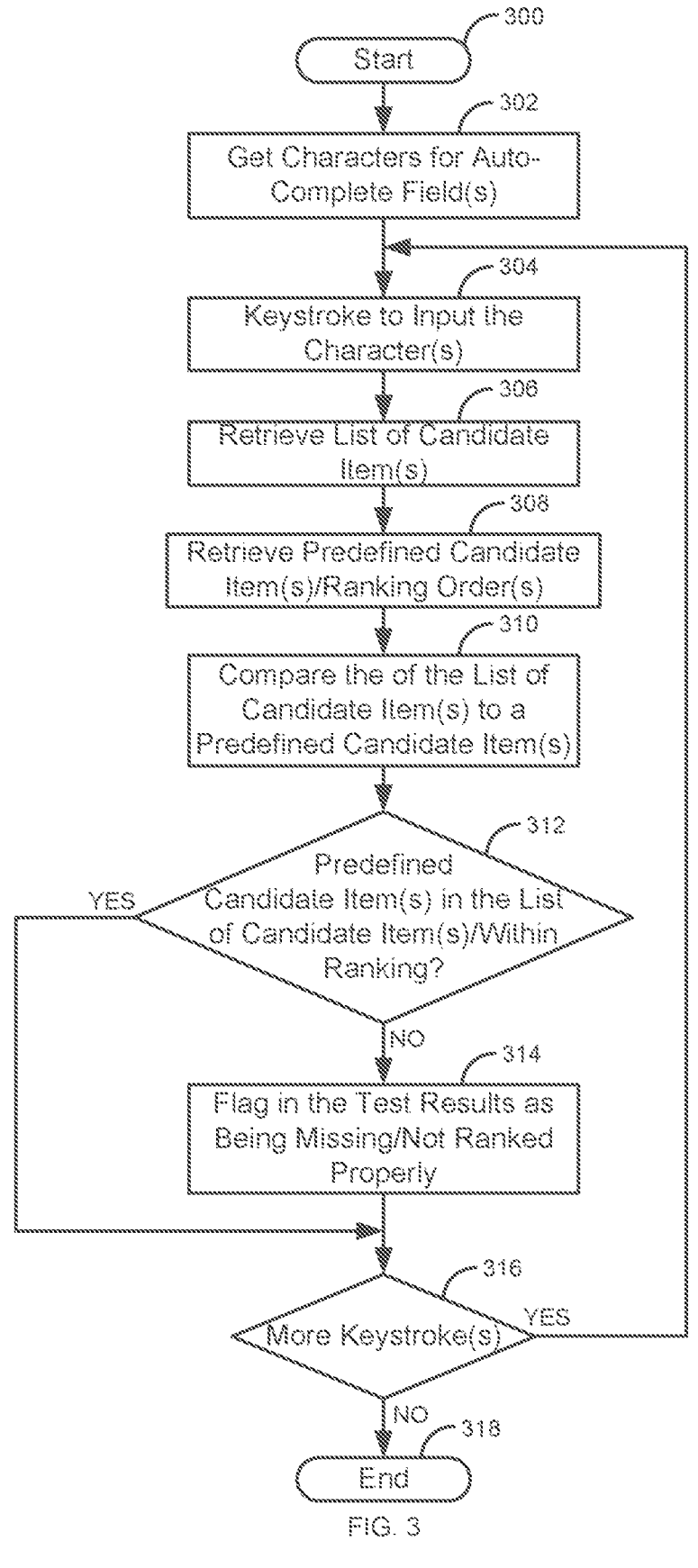
FIG. 3 is a flow diagram of a process for testing auto-complete software in a graphical user interface.
Figure 4:
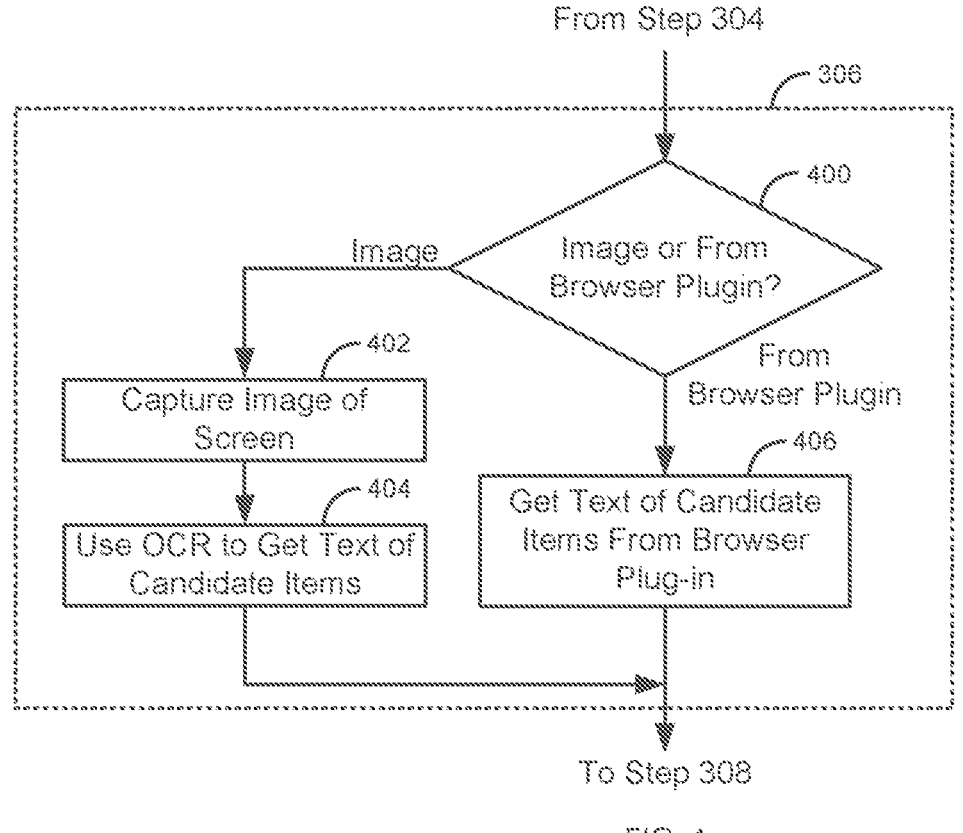
FIG. 4 is a flow diagram of a process retrieving text of a list of candidate items.

FIG. 3 is a flow diagram of a process for testing auto-complete software in a graphical user interface 102. Illustratively, the communication device 101, the graphical user interface 102, the image capture module 103, the auto-complete script 104, the script manager 105, the browser 106, the browser plugin 107, the server 120, and the AUT 121 are stored-program-controlled entities, such as a computer or microprocessor, which performs the method of FIGS. 2-4 and the processes described herein by executing program instructions stored in a computer readable storage medium, such as a memory (i.e., a computer memory, a hard disk, and/or the like). Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts in step 300. The auto-complete script 104 retrieves the characters to input into the auto-complete field(s) 200 in step 302. The auto-complete script 104 inputs the character(s) into the auto-complete field(s) 200 in step 304. The auto-complete script 104 may input the character(s) in various ways. For example, the auto-complete script 104 may input the characters (a keystroke) one at a time, in a group (e.g., two characters), using a combination of one at a time/group, and/or the like.

The auto-complete script 104 retrieves, in step 306, the displayed list of candidate items 202. The displayed list of candidate items 202 may have one or more candidate items 204 (or may have zero candidate items 204). The displayed list of candidate items 202 may be retrieved in various ways, such as, via image capture, via the browser plugin 107 (capturing source code), and/or the like.

The auto-complete script 104 retrieves, in step 308, the predefined candidate item(s) and any rankings. The predefined candidate item(s) may have a ranking order. For example, the first predefined candidate item has to appear in the top two of the candidate items 204A-204B. Likewise, the second predefined candidate item may have to appear in the top three of the captured candidate item(s) 204A-204C. The third predefined candidate item may have to appear in the range of three to five in the captured list of candidate item(s) 204C-204F and so on.

The text of the list of each of the candidate items (e.g., 204A-204N) is compared to a list of predefined candidate item(s) in step 310. The predefined candidate item(s) may be in the source code of the auto-complete script 104. The process may check for multiple candidate items 204 at the same time. In one embodiment, the predefined candidate items may be different based on configuration. For example, an option may be where the user can configure the list of candidate items 202 to only display a fixed number of candidate items 204 or a maximum number of candidate items 204.

If the predefined candidate item(s) are in the list of the candidate item(s) 202 in step 312 and the candidate items 204 are ranked properly, the process goes to step 316. Otherwise, if the predefined candidate item(s) are not in the list of candidate item(s) 202 or are not ranked properly in step 312, the auto-complete script 104 flags the test results that the predefined candidate item(s) are missing or not ranked properly in step 314. For example, if Japanese string マクドナルド was not in the displayed list of candidate items 202 when it was supposed to be in the displayed list of candidate items 202, the Japanese string マクドナルド will be flagged as being missing in step 312. Likewise, if the Japanese string マクドナルド was not ranked within a defined range, the string will be flagged as not being in the proper ranking order. The results of step 314 may be stored in a test log.

The auto-complete script 104 determines if there are more keystrokes/characters in step 316. For example, as described above the Japanese character マ may take three keystrokes before the character マ is displayed. If there are more keystrokes in step 316, the process goes back to step 304 to input the next character. Thus, the process can be repeated for each keystroke/character (or character groups). Otherwise, if there are not any more keystrokes in step 316, the process ends in step 318.

FIG. 4 is a flow diagram of a process retrieving text of a displayed list of candidate items 202. FIG. 4 is an exemplary embodiment of step 306 of FIG. 3. After inputting the character(s) in step 304, auto-complete script 104 determines, in step 400, if the displayed list of candidate items 202 is captured via an image or from the code of the browser 106 (e.g., via the browser plugin 107). If the displayed list of candidate items 202 is captured from an image in step 400, an image of the screen is captured in step 402. Optical Character Recognition (OCR) is used to retrieve the text of the candidate item(s) 204 in step 404 and the process then goes to step 308.

Otherwise, if the list of candidate item(s) 202 is to be captured via the browser plugin 107, the text of the candidate items 204 is captured by the browser plugin 107 in step 406 from the code displayed in the browser 106. The process then goes to step 308.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system, comprising:
a microprocessor; and
a computer readable medium, coupled with the microprocessor and comprising microprocessor readable and executable instructions that, when executed by the microprocessor, cause the microprocessor to:
input one or more characters into an auto-complete field;
retrieve text of a displayed list of one or more candidate items;
compare the text of the displayed list of the one or more candidate items to a predefined candidate item; and
in response to the text of the displayed list of one or more candidate items not being within a ranking range, flag, in a test result, that the predefined candidate item is not within the ranking range,
wherein the ranking range requires the predefined candidate item to appear within a specified top number of positions of the displayed list of one or more candidate items.

2. The system of claim 1,
wherein the one or more characters comprise a plurality of characters;
wherein inputting the plurality characters into the auto-complete field comprises inputting each of the plurality of characters one at a time;
wherein retrieving the text of the displayed list of one or more candidate items comprises retrieving a plurality of texts of a plurality of displayed lists of the one or more candidate items;
wherein comparing the text of the displayed list of the one or more candidate items to the predefined candidate item comprises comparing the plurality of texts of the plurality of the displayed lists of the one or more candidate items to a plurality of predefined candidate items; and
wherein in response to the text of the plurality of texts of the plurality of displayed list of one or more candidate items not being within the ranking range, flagging, in the test result, that the one or more of the plurality of predefined candidate items is not within the ranking range.

3. The system of claim 2, wherein the plurality of predefined candidate items each comprises a list of a plurality candidate items and wherein each of the lists of the plurality of candidate items is different as each of the plurality of characters are input one at a time.

4. The system of claim 3, wherein one or more of the plurality of predefined candidate items has the ranking range.

5. The system of claim 1, wherein the one or more characters comprises a plurality of characters that are input at the same time.

6. The system of claim 1, wherein the displayed list of the one or more candidate items comprises a plurality of candidate items and wherein the predefined candidate item has to be in the ranking range in the list of the one or more candidate items.

7. The system of claim 1, wherein the one or more characters are for a language that requires multiple keystrokes to generate a character.

8. The system of claim 1, wherein retrieving the text of the displayed list of one or more candidate items comprises one of:
retrieving the text of the displayed list of one or more candidate items from a browser plugin; or
capturing an image of the displayed list of the one or more candidate items and converting the displayed list of the one or more candidate items in the image using optical character recognition.

9. A method, comprising:
inputting, by a microprocessor, one or more characters into an auto-complete field;
retrieving, by the microprocessor, text of a displayed list of one or more candidate items;
comparing, by the microprocessor, the text of the displayed list of the one or more candidate items to a predefined candidate item; and
in response to the text of the displayed list of one or more candidate items not being within a ranking range, flag, in a test result, that the predefined candidate item is not within the ranking range,
wherein the ranking range requires the predefined candidate item to appear within a specified top number of positions of the displayed list of one or more candidate items.

10. The method of claim 9,
wherein the one or more characters comprise a plurality of characters;
wherein inputting the plurality characters into the auto-complete field comprises inputting each of the plurality of characters one at a time;
wherein retrieving the text of the displayed list of one or more candidate items comprises retrieving a plurality of texts of a plurality of displayed lists of the one or more candidate items;
wherein comparing the text of the displayed list of the one or more candidate items to the predefined candidate item comprises comparing the plurality of texts of the plurality of the displayed lists of the one or more candidate items to a plurality of predefined candidate items; and
wherein in response to the text of the plurality of texts of the plurality of displayed list of one or more candidate items not being within the ranking range, flagging, in the test result, that the one or more of the plurality of predefined candidate items is missing from the test result or is not within the ranking range.

11. The method of claim 10, wherein the plurality of predefined candidate items each comprises a list of a plurality candidate items and wherein each of the lists of the plurality of candidate items is different as each of the plurality of characters are input one at a time.

12. The method of claim 11, wherein one or more of the plurality of predefined candidate items has the ranking range.

13. The method of claim 9, wherein the one or more characters comprises a plurality of characters that are input at the same time.

14. The method of claim 9, wherein the displayed list of the one or more candidate items comprises a plurality of candidate items and wherein the predefined candidate item has to be in the ranking range in the list of the one or more candidate items.

15. The method of claim 9, wherein the one or more characters are for a language that requires multiple keystrokes to generate a character.

16. The method of claim 9, wherein retrieving the text of the displayed list of one or more candidate items comprises one of:

retrieving, by the microprocessor, the displayed list of one or more candidate items from a browser plugin; or capturing an image of the displayed list of the one or more candidate items and converting the displayed list of the one or more candidate items in the image using optical character recognition.

17. A non-transient computer readable medium having stored thereon instructions that cause a processor to execute a method, the method comprising instructions to:

input one or more characters into an auto-complete field;

retrieve text of a displayed list of one or more candidate items;

compare the text of the displayed list of the one or more candidate items to a predefined candidate item; and in response to the text of the displayed list of one or more candidate items not being within a ranking range, flag, in a test result, that the predefined candidate item is not within the ranking range, wherein the ranking range requires the predefined candidate item to appear within a specified top number of positions of the displayed list of one or more candidate items.

18. The non-transient computer readable medium of claim 17, wherein the one or more characters comprise a plurality of characters;

wherein inputting the plurality characters into the auto-complete field comprises inputting each of the plurality of characters one at a time;

wherein retrieving the text of the displayed list of one or more candidate items comprises retrieving a plurality of texts of a plurality of displayed lists of the one or more candidate items;

wherein comparing the text of the displayed list of the one or more candidate items to the predefined candidate item comprises comparing the plurality of texts of the plurality of the displayed lists of the one or more candidate items to a plurality of predefined candidate items; and wherein in response to the text of the plurality of texts of the plurality of displayed list of one or more candidate items not being within a ranking range, flagging, in the test result, that the one or more of the plurality of predefined candidate items is not within the ranking range.

19. The non-transient computer readable medium of claim 18, wherein the plurality of predefined candidate items each comprises a list of a plurality candidate items and wherein each of the lists of the plurality of candidate items is different as each of the plurality of characters are input one at a time.

20. The non-transient computer readable medium of claim 19, wherein one or more of the plurality of predefined candidate items has the ranking range.

* * * * *